(12) United States Patent
Nicholson et al.

(10) Patent No.: US 11,397,456 B2
(45) Date of Patent: Jul. 26, 2022

(54) SELECTIVE NOTIFICATION BASED ON CHARGE HISTORY

(71) Applicant: LENOVO (Singapore) PTE. LTD., New Tech Park (SG)

(72) Inventors: John Weldon Nicholson, Cary, NC (US); Howard Locker, Cary, NC (US); Daryl Cromer, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 680 days.

(21) Appl. No.: 16/368,745

(22) Filed: Mar. 28, 2019

(65) Prior Publication Data

US 2020/0310514 A1 Oct. 1, 2020

(51) Int. Cl.
*G06F 1/3206* (2019.01)
*G06F 16/22* (2019.01)
*H02J 7/00* (2006.01)
*G06F 1/28* (2006.01)
*G06F 1/26* (2006.01)

(52) U.S. Cl.
CPC .......... *G06F 1/3206* (2013.01); *G06F 16/22* (2019.01); *G06F 1/263* (2013.01); *G06F 1/28* (2013.01); *H02J 7/0047* (2013.01)

(58) Field of Classification Search
CPC .......... G06F 1/263; G06F 1/28; G06F 1/3206; G06F 16/22; H02J 7/0047
See application file for complete search history.

(56) References Cited

U.S. PATENT DOCUMENTS

2016/0046199 A1\* 2/2016 Butler ................... H02J 7/0071 320/106
2016/0047862 A1\* 2/2016 Shimizu ............... G06Q 20/384 702/63
2018/0026462 A1\* 1/2018 Von Novak, III ...... H04W 4/80 320/107
2018/0351373 A1\* 12/2018 Behzadi ................ H02J 7/0047

\* cited by examiner

*Primary Examiner* — Terrell S Johnson
(74) *Attorney, Agent, or Firm* — Kunzler Bean & Adamson

(57) ABSTRACT

For selectively providing notifications based on charge history, methods, apparatus, and systems are disclosed. One apparatus includes a processor and a memory that stores code executable by the processor. The processor determines a device location for the apparatus and identifies a charge history corresponding to the device location. The processor further selects a notification based on the charge history and presents the notification based on a charging status of the apparatus.

20 Claims, 7 Drawing Sheets

SELECTIVE NOTIFICATION BASED ON CHARGE HISTORY

FIELD

The subject matter disclosed herein relates to electronic communications and more particularly relates to selectively providing notifications based on charge history.

BACKGROUND

Battery-powered device users are not always aware of how close to empty their battery is. In some locations it does not matter as charging is readily available. In other locations it may not be possible to charge.

BRIEF SUMMARY

An apparatus for selectively providing notifications based on charge history is disclosed. A method and computer program product also perform the functions of the apparatus.

One apparatus for selectively providing notifications based on charge history includes a processor and a memory that stores code executable by the processor. The processor determines a device location for the apparatus and identifies a charge history corresponding to the device location. The processor further selects a notification based on the charge history and presents the notification based on a charging status of the apparatus.

In certain embodiments, the processor maintains a charge database based on the charge history. In such embodiments, the charge database may store a charger state (e.g., 'charger-attach', 'charger-detach', 'charging-start' or 'charging-stop'), a charge location associated with the charger state, and a timestamp of the charger state.

In some embodiments, selecting the notification comprises selecting a default notification in response to the charge history having less than a threshold number of datapoints. In some embodiments, selecting the notification comprises selecting a reminder to charge the apparatus in response to the charge history indicating a charger is available at the device location. In such embodiments, wherein presenting the notification based on a charging status of the apparatus may include presenting the notification a preset amount of time after arriving at the device location.

In certain embodiments, the processor calculates an expected charge time based on a state-of-charge of the apparatus and estimates a time-of-departure based on a location history corresponding to the device location. In such embodiments, presenting the notification based on a charging status of the apparatus may include presenting the notification based on the expected charge time and the time-of-departure.

In certain embodiments, the processor selects a power management mode based on the charge history corresponding to the device location. In one embodiment, selecting the power management mode includes automatically implementing a best-performance power management mode in response to the charge history indicating that the apparatus is often charged at the device location or is charged for a long duration. In another embodiment, selecting the power management mode includes adjusting a threshold value for transitioning to a battery-saving power management mode.

One method for selectively providing notifications based on charge history includes determining a location for an electronic device and identifying a charge history corresponding to the location. The method also includes selecting a notification based on the charge history and presenting the notification based on a charging status of the electronic device.

In some embodiments, the method further includes maintaining a charge database based on the charge history. In such embodiments, the charge database may store at least a charger state, a physical location associated with the charger state, and a timestamp of the charger state.

In certain embodiments, selecting the notification comprises selecting a default notification in response to the charge history having less than a threshold number of datapoints. In certain embodiments, selecting the notification comprises selecting a reminder to charge the electronic device in response to the charge history indicating a charger is available at the location. In certain embodiments, presenting the notification based on a charging status of the electronic device comprises presenting the notification a preset amount of time after arriving at the location.

In some embodiments, the method further includes calculating an expected charge time based on a state-of-charge of the electronic device and estimating a time-of-departure based on a location history corresponding to the location. In such embodiments, presenting the notification based on a charging status of the electronic device may include presenting the notification based on the expected charge time and the time-of-departure.

In some embodiments, the method further includes selecting a power management mode based on the charge history corresponding to the location. In one embodiment, selecting the power management mode comprises automatically implementing a best-performance power management mode in response to the charge history indicating that the electronic device is often charged at the location or is charged for a long duration. In another embodiment, selecting the power management mode includes adjusting a threshold value for transitioning to a battery-saving power management mode.

A program product comprising a computer readable storage medium that stores code executable by a processor, the executable code comprising code to detect a location of an electronic device and to identify a charge history corresponding to the location. The program product further contains code to select a notification based on the charge history and to present the notification based on a charging status of the electronic device.

In some embodiments, the program product includes code to maintain a charge database based on the charge history. Here, the charge database may store at least a charger state, a geographical location associated with the charger state, and a timestamp of the charger state.

In some embodiments, the program product includes code to select a power management mode based on the charge history corresponding to the location.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
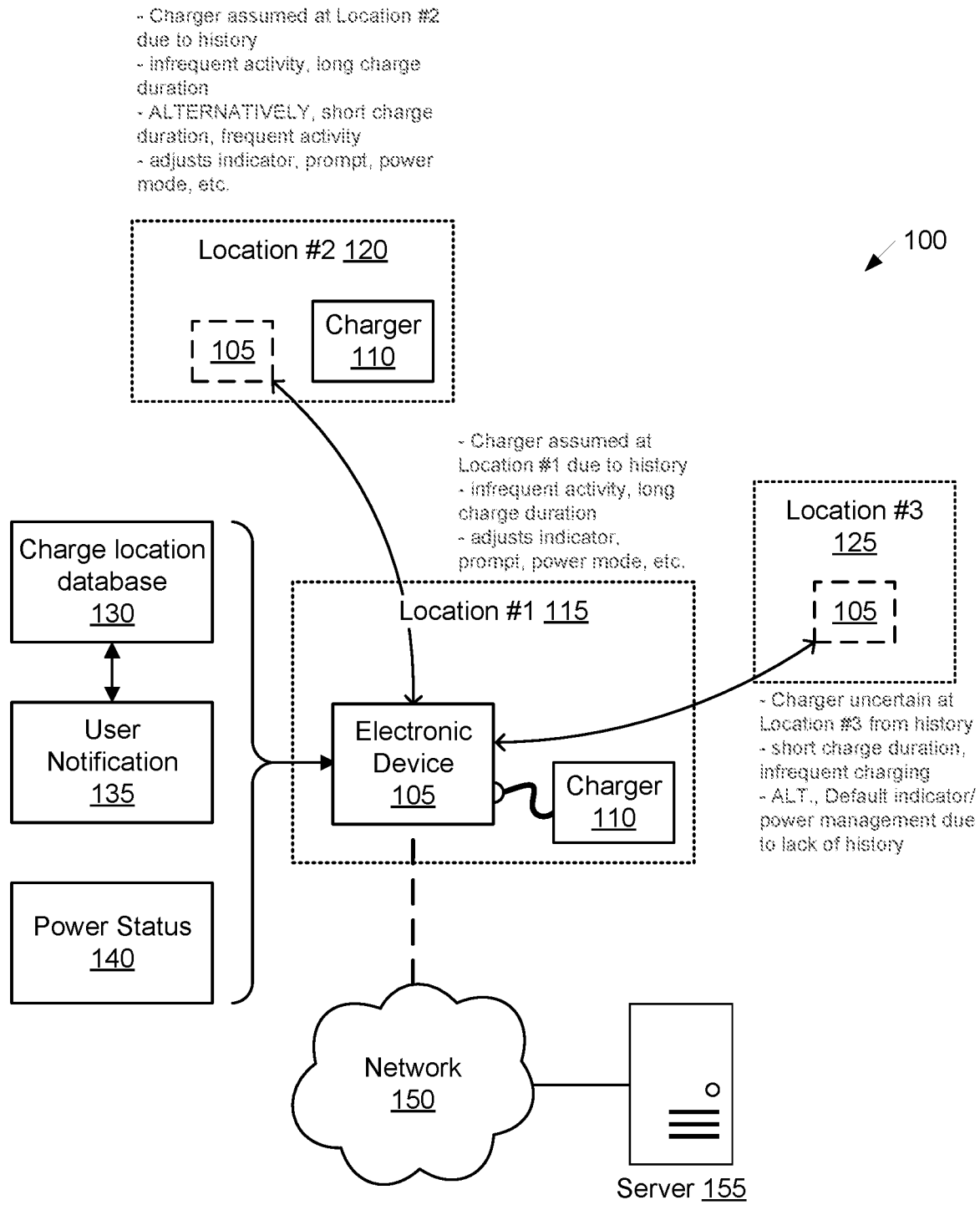
FIG. 1 is a schematic block diagram illustrating one embodiment of a system for selectively providing notifications based on charge history.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer readable storage devices storing machine readable code, computer readable code, and/or program code, referred hereafter as code. The storage devices are tangible, non-transitory, and/or non-transmission. The storage devices do not embody signals. In a certain embodiment, the storage devices may employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

For selectively providing notifications based on charge history, methods, systems, and apparatuses are disclosed herein. Users are not always aware of how close to empty their battery is. In some locations it does not matter as charging is readily available. In other locations it may not be possible to charge. Current solutions don't consider past charge history or current location in determining how to manage the battery and notify the user. The methods, systems, and apparatuses disclosed herein vary power management and user notification based on current location history of charging.

In various embodiments, the physical location is stored every time the electronic device is attached to charger. Thus, a database of charge history is built over time. In some embodiments, this database indicates the number of times over a window of time (e.g., the last X days) the notebook has been attached to a charger at each location and an amount of time (duration) in that location. Various power management policy rules may be implemented at a current location based on the information in the database. For example, a power management scheme (e.g., power mode) may be set or adjusted based on the location. As another example, the types and timing of user notifications are set or adjusted based on the location.

FIG. 1 depicts a system 100 for selectively providing notifications based on charge history, according to embodiments of the disclosure. The system 100 includes an electronic device 105. The electronic device 105 stores a charge history 130 used to select location-specific user notifications 135 and/or adjust power management settings of the electronic device 105. In various embodiments, the selection is based on a power status 140 of the electronic device 105.

In the depicted embodiment, the electronic device 105 is located at a first location ("Location #1") 115. Here, the charge history 130 indicates that first location 115 includes a charger 110 that may be used to recharge a battery of the electronic device 105. In various embodiments, the electronic device 105 automatically switches to a high-performance power management mode based on the known availability of the charger 110 at the first location 115, even if the electronic device 105 is currently unplugged from the charger 110. The electronic device 105 may move to another location associated with prior charging of the electronic device 105.

In some embodiments, the first location 115 is associated with frequent charging activity (e.g., high recurrence of charging at the location). Moreover, the first location 115 may be associated with the electronic device 105 being plugged into the charger 110 for long periods of time (e.g., long charging duration). For example, the first location 115 may correspond to the user's home, the user's office, or the like. Note that the electronic device 105 does not care about the significance of the location, just that charging activity has occurred at the second location 120. Based on these associations, the electronic device 105 may implement certain policy rules relating to power management and related notifications, as discussed in further detail below.

In some embodiments, the electronic device 105 is located at a second location ("Location #2) 120. Here, the charge history 130 may indicate that second location 120 also includes a charger 110 that may be used to recharge a battery of the electronic device 105. Again, the electronic device 105 may automatically switch to a high-performance power management mode based on the known availability of the charger 110 at the second location 120, even if the electronic device 105 is currently unplugged from the charger 110.

In certain embodiments, the second location 120 is associated with infrequent charging activity (e.g., relatively low recurrence of charging at the location). Moreover, the second location 120 may be associated with the electronic device 105 being plugged into the charger 110 for long periods of time (e.g., long charging duration). For example, the second location 120 may correspond to the house of a friend or relative, a visitor's office, a study hall, or the like. Based on these associations, the electronic device 105 may implement certain policy rules relating to power management and related notifications, as discussed in further detail below.

In other embodiments, the second location 120 may be associated with frequent charging activity (e.g., relatively high recurrence of charging at the location, indicating a charger 110 is often available), but only being plugged into the charger 110 for short periods of time (e.g., insufficient period of time to fully charge a depleted battery). For example, the second location 120 may correspond to a classroom, an airport, a library, a coffee shop, a visitor's office, or the like. Based on these associations, the electronic device 105 may implement certain policy rules relating to power management and related notifications, as discussed in further detail below.

In some embodiments, the electronic device 105 is located at a third location ("Location #3) 125. Here, the charge history 130 does not indicate that a charger 110 is available at the third location 125, even though the charge history shows the electronic device 105 has been recharged at the third location.

In certain embodiments, the third location 125 may associated with infrequent charging activity (e.g., relatively low recurrence of charging at the location) and with the electronic device 105 being plugged into the charger 110 for short periods of time (e.g., insufficient period of time to fully charge a depleted battery). The combination of low recurrence and short charging duration may indicate uncertain about the availability of a charger 110 at the third location 125. Based on these associations, the electronic device 105 may implement certain policy rules relating to power management and related notifications, as discussed in further detail below.

In other embodiments, the third location 125 may be a location where there is insufficient information in charge history 130 to select a policy rule. Based on the lack of charge history, the electronic device 105 may implement default policy rules relating to power management and related notifications, as discussed in further detail below.

In certain embodiments, the depicted locations 115-125 are locations where the user is present for a significant amount of time. For example, locations where the electronic device 105 remains for more than a threshold amount of time may be considered significant. As another example, locations that are visited more than a threshold amount of time within a time window may be considered significant. In certain embodiments, the electronic device 105 reverts to default power management policy rules unless the location is considered significant.

Moreover, while the locations 115-125 are discussed in terms of static locations, the principles described herein also apply to mobile platforms where the electronic device 105 may be charged. Here, the charge history 130 may indicate a charger 110 is available whenever a particular route or path is taken. Here, the route or path may be traveled by vehicle where a charger 110 is present in the vehicle. Examples include commuting to or from work (either using public transit or a personal vehicle), traveling to/from a regular destination, and the like.

The electronic device 105 may be any battery-powered device capable of recharging. In some embodiments, the electronic device 105 may be a portable computing device, including, but not limited to, a mobile phone, a smart phone, a smart watch, a fitness tracker, a media player, a tablet computer, a laptop computer, a handheld computer, a wearable computer, a gaming console, or the like. In certain embodiments, the electronic device 105 may be an accessory device with rechargeable battery, such as a headset, headphone, mouse, keyboard, portable speaker, a gaming controller, or the like. In other embodiments, the electronic device 105 may be a personal vehicle, such as an electric car, electric bicycle, electric scooter, electric skateboard, or the like. Note that in certain embodiments, the electronic device 105 may communicate with another device to provide the notification, determine the location, save the database, etc.

As discussed in greater detail herein, the electronic device 105 detects a location of an electronic device and to identifies a charge history corresponding to the location. Based on the location and charge history, the electronic device 105 selects a notification. Moreover, the electronic device 105 may present the notification based on a charging status of the electronic device. Additionally, the electronic device 105 may select (and implement) a power management mode based on the charge history corresponding to the device location.

Various power management policy rules may be implemented at a current location based on the information in the database. For example, a power management scheme (e.g., power mode) may be set or adjusted based on the location. As another example, the types and timing of user notifications are set or adjusted based on the location.

One example of a policy rule is to remind a user to plug the electronic device 105 into a charger 110. In one embodiment, this policy rule is implemented whenever the charge history indicates a charger 110 is present at the location and the charging status indicates that the electronic device 105 is not currently plugged in to a charger 110.

In a first scenario, the average duration of charging at a location is categorized as 'long' and the frequency of charging at this location (e.g., over the last X days) is categorized as 'often.' In one embodiment, the first scenario applies to the first location 115. Here, the charge history 130 indicates a charger 110 is present at the location. Moreover, because the user has often charged the electronic device 105 for a long time in this location (e.g., regular office), the electronic device 105 may provide a message if for some reason they aren't charging (e.g., just forgot, or adapter not plugged in at wall). An example notification includes: "When you're at this location you usually are charging; did you forget to plug in?"

In certain embodiments, if the average duration of charging at a location is categorized as 'long' and a frequency of charging at this location (e.g., over last X days) is categorized as 'often,' then if at this location the electronic device 105 is not being charged, then the electronic device 105 may notify user to plug in when current estimate for time left to fully charge battery is equal to current estimate for time left at this location. An example notification includes: "Based on past time spent here, if you plug in now you should be fully charged before you leave."

In various embodiments, the electronic device 105 automatically switches to a high-performance power management mode based on the known availability of the charger 110 at the first location 115, even if the electronic device 105 is currently unplugged from the charger 110.

In a second scenario, the average duration of charging at a location is categorized as 'long' and the frequency of charging at this location (e.g., over the last X days) is categorized as 'infrequently.' In one embodiment, the second scenario is applicable to the second location 120. Here, the charge history indicates that a charger 110 is available at the current location (due to charging for a long time in this location), even though the user doesn't frequently charge here. Moreover, because the user has charged the electronic device 105 for a long time in this location, the electronic device 105 may provide a notification reminding the user to charge at the location. An example notification includes: "I've noticed you don't frequently charge here, just wanted to remind you."

In certain embodiments, rather than presenting the reminder notification right away, the electronic device waits to present the message until a threshold amount of time has passed (e.g., 20 minutes), or the battery state-of-charge passes below a threshold charge level (e.g., 60%). In certain embodiments, if the second scenario applies the electronic device 105 does not automatically switch to the high-performance mode, but instead selects a notification prompting the user to switch to the high-performance mode (e.g., asks for confirmation before switching to the high-performance mode).

In a third scenario, the average duration of charging at a location is categorized as 'short' and the frequency of charging at this location (e.g., over the last X days) is categorized as 'often.' In one embodiment, the third scenario is applicable to the second location 120. Here, the charge history indicates that a charger 110 is available at the current location (e.g., due to charging often at this location), even though the user doesn't charge for a long time here. Moreover, because the user has charged the electronic device 105 for a short time in this location, the electronic device 105 may provide a notification to charge up while at the location. An example notification includes: "If you start charging now my battery will go from x to y in z minutes, your average duration at this location."

In a fourth scenario, the average duration of charging at a location is categorized as 'short' and the frequency of charging at this location (e.g., over the last X days) is categorized as 'infrequent.' In one embodiment, the fourth scenario is applicable to the third location 125. Here, the charge history does not indicate that a charger 110 is available at the current location, e.g., due to charging sporadically and for short intervals at this location. Because of the unknown availability of a charger 110 at this location, the electronic device 105 may provide a notification to charge up when the battery level passes below a threshold. An example notification includes: "If you charge now, my battery can go from x to y in z minutes of charging."

Additionally, if the fourth scenario applies then the electronic device 105 may preemptively switch to a battery saving mode or may adjust a threshold for automatically triggering the battery saving mode to do so at a relatively higher battery charge level (e.g., higher than levels in the first, second, or third scenarios).

In a fifth scenario, the charge history is insufficient to categorize the average duration of charging and/or the frequency of charging at this location. In one embodiment, the electronic device 105 has not been previously charged at the location. In another embodiment, the charge history has less than a threshold number of data points associated with the location. If the fifth scenario applies, then the electronic device 105 applies existing (e.g., default) solution for power management modes and notifications. However, if the electronic device 105 has sufficient charge history for this location, then the message interaction and power configuration may be according to the above scenarios.

In certain embodiments, the system 100 also includes a server 155 accessible via a network 150. The network 150 may include one or more data networks, including, but not limited to, telephone networks, local area networks, wireless networks, the Internet, and the like. In one embodiment, the electronic device 105 may access the server 155 via the network 150 to store and/or retrieve charge history. In another embodiment, the electronic device 105 uploads charge history to the server 155 which analyzes the history and send policy instructions to the electronic device 105 based on the charge history. For example, the server 155 may determine that any of the first, second third, fourth, or fifth scenarios described above applies and to implement a policy rule corresponding to the identified scenario. In further embodiments, the server 155 may provide the electronic device 105 with power management notifications according to the embodiments described herein.

Figure 2:
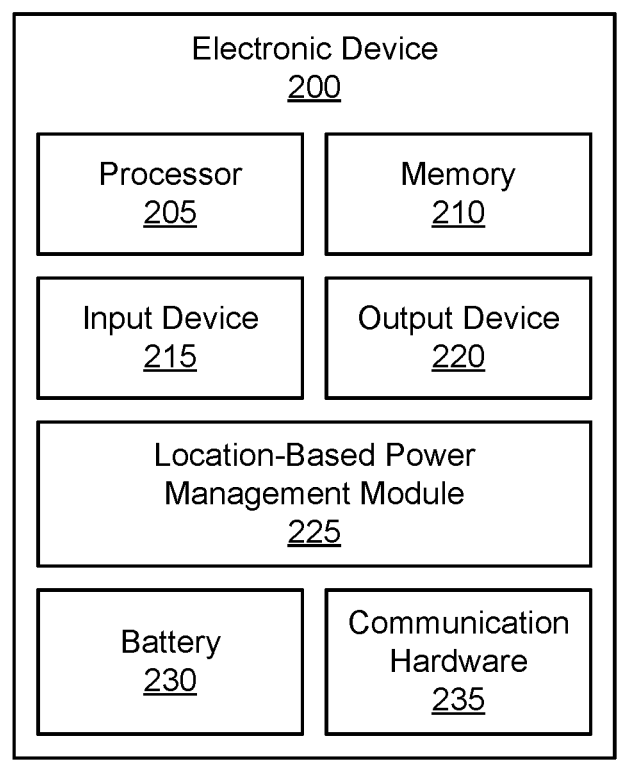
FIG. 2 is a schematic block diagram illustrating one embodiment of an apparatus for selectively providing notifications based on charge history.

FIG. 2 depicts an electronic device 200 for selectively providing notifications based on charge history, according to embodiments of the disclosure. The electronic device 200, may be one embodiment of the electronic device 105. The electronic device 200 may include a processor 205, a memory 210, an input device 215, an output device 220, a location-based power management module 225, a battery 230, and communication interface 235. In certain embodiments, the electronic device 200 contains the processor 205, the memory 210, the location-based power management module 225, and the battery 230, but does not include one or more of: the input device 215, the output device 220, and/or the communication interface 235.

The electronic device 200 may include a body or an enclosure, with the components of the electronic device 200 being located within the enclosure. The battery 230 provides electrical power to the electronic device 200. The processor 205 and/or the location-based power management module 225 may obtain state-of-charge information (e.g., the level of charge), state-of-health information, state-of-power information, temperature, voltage information, charging current information, discharge current information, and similar data from the battery 230. Moreover, the components of the electronic device 200 are communicatively coupled to each other, for example via a computer bus.

The processor 205, in one embodiment, may comprise any known controller capable of executing computer-readable instructions and/or capable of performing logical operations. For example, the processor 205 may be a microcontroller, a microprocessor, a central processing unit (CPU), a graphics processing unit (GPU), an auxiliary processing unit, a FPGA, or similar programmable controller. In some embodiments, the processor 205 executes instructions stored in the memory 210 to perform the methods and routines described herein. The processor 205 is communicatively coupled to the memory 210, the input device 215, the output device 220, the location-based power management module 225, the battery 230, and the communication interface 235.

The memory 210, in one embodiment, is a computer readable storage medium. In some embodiments, the memory 210 includes volatile computer storage media. For example, the memory 210 may include a random-access memory ("RAM"), including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data relating to selectively providing notifications based on charge history while the user is looking at a second user interface. For example, the memory 210 may store a charge database, locations, movement patterns, charging policies, notification, and the like. In some embodiments, the memory 210 also stores program code and related data, such as an operating system operating on the electronic device 200. In one embodiment, the location-based power management module 225 may be embodied in a software application (or set of software applications) stored in the memory 210 and operating on the electronic device 200 (e.g., running on the processor 205).

The input device 215, in one embodiment, may comprise any known computer input device including a touch panel, a button, a keyboard, a microphone, a camera, and the like. For example, the input device 215 may include a microphone or similar audio input device with which a user inputs sound or voice data (e.g., voice commands). In some embodiments, the input device 215 (or portion thereof) may be integrated with the output device 220, for example, as a touchscreen or similar touch-sensitive display. In some embodiments, the input device 215 comprises two or more different devices, such as a microphone and a touch panel.

The output device 220, in one embodiment, is configured to output visual, audible, and/or haptic signals. In some embodiments, the output device 220 includes an electronic display capable of outputting visual data to a user. For example, the output device 220 may include an LCD display, an LED display, an OLED display, a projector, or similar display device capable of outputting images, text, or the like to a user. In certain embodiments, the output device 220 includes one or more speakers for producing sound, such as an audible alert or notification. In some embodiments, the output device 220 includes one or more haptic devices for producing vibrations, motion, or other haptic output.

In some embodiments, all or portions of the output device 220 may be integrated with the input device 215. For example, the input device 215 and output device 220 may form a touchscreen or similar touch-sensitive display. As another example, the input device 215 and output device 220 may form a display that includes haptic response mechanisms. In other embodiments, the output device 220 may be located near the input device 215. For example, a microphone, speakers, and touchscreen may all be located on a common surface of the electronic device 200. The output device 220 may receive instructions and/or data for output from the processor 205 and/or the location-based power management module 225.

The location-based power management module 225, in one embodiment, is configured to determine a device location for the apparatus. The location-based power management module 225 identifies a charge history corresponding to the device location. In certain embodiments, the charge history indicates a charge recurrence for the location. The charge recurrence is an indicator of how often the electronic device 200 is charged at the location. In one embodiment, the charge recurrence is based on a number of times the electronic device 200 is charged at the location over a moving time window, such as the last 14 days. Moreover, the charge recurrence may indicate a recurrence category for the location, such as a location where charging frequently occurs or a location where charging infrequently occurs.

In certain embodiments, the charge history indicates a charge duration for the location. The charge duration corresponds to how long the electronic device 200 is connected to a charger. Here, the charge duration includes time spent recharging the battery as well as time where the electronic device 200 is plugged in but not charging. Moreover, the charge duration may indicate a duration category for the location, such as a location where the electronic device is connected to the charger for a long time, or a location where the electronic device 200 is connected to the charger for a short time.

In some embodiments, the location-based power management module 225 maintains a charge database based on the charge history. In such embodiments, the charge database may store a charger state (e.g., 'charger attached' or 'charger detached'), a charge location associated with the charger state, and a timestamp of the charger state. In certain embodiments, the charger state also indicates an associated battery status, such as 'battery charging,' 'battery discharging,' or 'battery not charging'). In one embodiment, the charger state is stored using a 1-bit flag (one value indicating charger was connected/attached and the other value indicating charger was disconnected/detached). In another embodiment, the charger state is stored using a descriptive string. Here, the charge database may store a new entry each time a change to the charger state occurs. Moreover, the charge database may only store data for a certain amount of time, such as the last month, to keep the database size manageable.

In certain embodiments, the location-based power management module 225 may periodically summarize the charge database, for example by computing a charge recurrence (the number of times over the last X days that the electronic device 200 has been attached to a charger) for each location and a charge duration (amount of time attached to the charger) in that location. In certain embodiments, the location-based power management module 225 may categorize the charge duration (e.g., long v. short) and/or charge recurrence (e.g., frequent v. infrequent).

The location-based power management module 225 selects a notification based on the charge history. In some embodiments, selecting the notification comprises selecting a default notification in response to the charge history having less than a threshold number of datapoints. In some embodiments, selecting the notification comprises selecting a reminder to charge the electronic device 200 in response to the charge history indicating a charger is available at the device location.

The location-based power management module 225 may also present the notification based on a charging status of the electronic device 200. In some embodiments, wherein presenting the notification based on a charging status of the electronic device 200 may include presenting the notification a preset amount of time after arriving at the device location. In certain embodiments, presenting the notification based on a charging status of the electronic device 200 may include presenting the notification once the battery state-of-charge drops below a certain level.

In certain embodiments, the location-based power management module 225 calculates an expected charge time based on a state-of-charge of the electronic device 200. Here, the selected notification may include an indication of the expected charge time. In further embodiments, the location-based power management module 225 may estimate a time-of-departure based on a location history corresponding to the device location. In such embodiments, presenting the notification based on a charging status of the electronic device 200 may include presenting the notification based on the expected charge time and the time-of-departure. For example, the notification may occur when the estimated time to fully charge the battery is equal to (or within a threshold value of) a time remaining before the estimated time-of-departure.

In certain embodiments, the location-based power management module 225 selects a power management mode based on the charge history corresponding to the device location. In one embodiment, selecting the power management mode includes automatically implementing a best-performance power management mode in response to the charge history indicating that the electronic device 200 is often charged at the device location or is charged for a long duration. In another embodiment, selecting the power management mode includes adjusting a threshold value for transitioning to a battery-saving power management mode.

The communication interface 235 may include hardware circuits and/or software (e.g., drivers, modem, protocol/network stacks) to support wired or wireless communication between the electronic device 200 and another device or network, such as the network 150. The wireless connection may include a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

Figure 3:
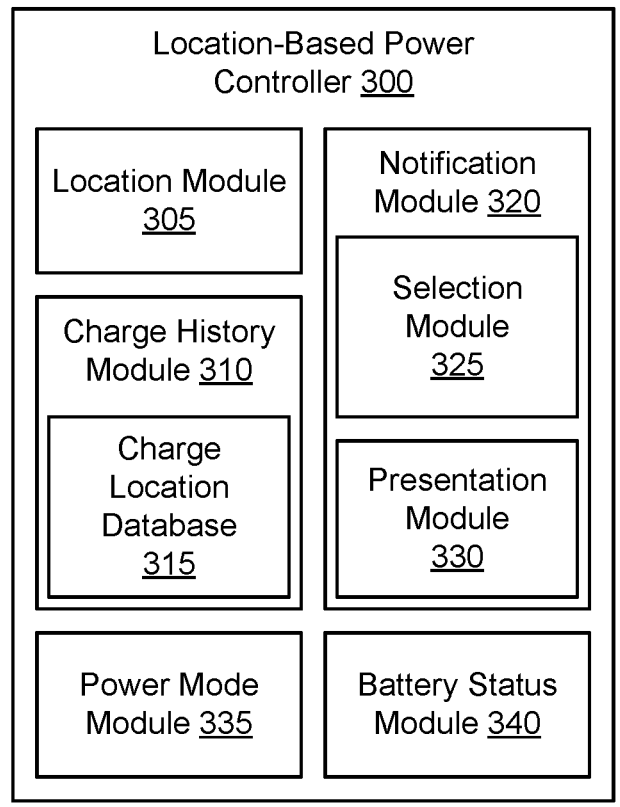
FIG. 3 is a schematic block diagram illustrating one embodiment of a data capture controller for presenting data acquired from a first user interface while the user is looking at a second user interface.

FIG. 3 depicts a location-based power controller 300 for selectively providing notifications based on charge history, according to embodiments of the disclosure. The location-based power controller 300 may be one embodiment of the location-based power management module 225, discussed above. Further, the location-based power controller 300 may be implemented on an electronic device, such as the electronic device 105 and/or electronic device 200. In one embodiment, the controller 300 may be implemented as a hardware circuit comprising custom VLSI circuits or gate arrays, off-the-shelf semiconductors such as logic chips, transistors, or other discrete components. The controller 300 may also be implemented in programmable hardware devices such as field programmable gate arrays, programmable array logic, programmable logic devices or the like.

As depicted, the location-based power controller 300 includes a plurality of modules. Specifically, the location-based power controller 300 may include a location module 305, a charge history module 310, and a notification module 320. In certain embodiments, the location-based power controller 300 may also include one or more of: a selection module 325, a presentation module 330, a power mode module 335, and a battery status module 340. The modules 305-340 may be implemented as hardware, software, or a combination of hardware and software.

The location module 305, in one embodiment, is configured to determine a device location. In various embodiments, the device location may correspond to a physical (e.g., geographical) location. The device location is used to identify candidate locations for charging the device. Here, the device location may correspond to locations where charging is taking place in the past (e.g., a location associated with the charge history of the device).

The location module 305 may include and/or be communicatively coupled to various positioning devices to identify the device location. In some embodiments, the device location is derived using satellite coordinates, for example, from a satellite positioning/navigation system. In some embodiments, the device location is derived using network locations (e.g., triangulation from wireless networks). In further embodiment, the device location may be an enhanced location including both coordinates and additional distinguishing information (e.g., connectable wireless networks, wireless network strengths, nearby devices, etc.). Such information may be used to distinguish e.g., a conference room from an office at the same street address. As another example, such additional information may be used to distinguish the user's home from a neighboring structure.

In some embodiments, the device location may be derived using QR code or other visual indicator of the room (or building) location. In certain embodiments, the device location may be derived using beacon information, such as an ultrasonic room identification beacon and/or a radio wave beacon (e.g., a BLUETOOTH beacon).

In some embodiments, the location module 305 stores information relating to how long the user is at a charging location. Here, "charging location" refers to a location where device is charged. Thus, the location module 305 may store information regarding the duration of the device's stay at the charging location, regardless of whether the device is being charged during the duration or not. As discussed in further detail below, the location module 305 may also estimate a time-of-departure from the device location (or time to remain at the device location), e.g., based on location history. Here, the location module 305 may maintain a location history of the device and/or have access to location history stored by another module or device.

The charge history module 310, in one embodiment, is configured to identify a charge history corresponding to the device location. In some embodiments, the device location corresponds to a location where the device previously been charged. In other embodiments, the device location corresponds to location with the device is not previously been charged. Here, the charge history module 310 may return a 'null' value or a predetermined value indicating a lack of charge history at the device location. Moreover, the charge history module 310 may determine an "amount" of charge history associated with the device location. If the amount of charge history is less than the threshold amount (e.g., if the charge history includes less than a predetermined amount of data points), then the charge history module 310 may also return the predetermined value (e.g., 'null' value).

In various embodiments, the charge history module 310 derives an average charging duration corresponding to the device location using the charge history. For example, the average charging duration may be categorized into long-duration or short-duration, wherein the location-based power controller 300 behaves differently based on the average charging duration (category) associated with the device location. In further examples, the average charging duration may include additional categories (e.g., medium-short, medium, medium-long, etc.). In certain embodiments, the charge history module 310 may store parameters for categorizing the charging duration, such as various ranges corresponding to each category.

In various embodiments, the charge history module 310 derives a charge recurrence corresponding to the device location, using the charge history. As used herein, the "charge recurrence" refers to an indication of how often the device is charged at the device location. In one embodiment, the deriving the charge recurrence includes counting the number of times the devices been charged at the device location during the past X days. Here, the value of X may be preset, or may be dynamically set (e.g., to maintain the relevance of the charge history and/or manage the size of the charge history).

In some embodiments, the charge history module 310 categorizes the charge recurrence. In one example, the charge recurrence is categorized as either "frequent" or "infrequent." In another example, the charge recurrence is categorized as "daily," "occasionally," or "rarely." The aforementioned examples are for the purpose of illustration only and are not to limit the categorization to the specific examples given.

In some embodiments, the charge recurrence takes into account the number of times that location is visited within the window of time. Thus, a location that is visited often (e.g., daily) but the device is only plugged-in at that location one or two times a week may be assigned to different category than a location that is visited less often (e.g., once or twice a week) but the device is plugged-in at that location almost every time the location is visited.

In various embodiments, the charge history module 310 stores and maintains a charge database 315. The charge database 315 stores charge history information of the device. In various embodiments, the charge database 315 stores information relating to when the device has been attached to a charger, locations corresponding to when the device has been attached to the charger, and times corresponding to when the device has been attached to or detached from the charger. The charge database 315 may store information relating to amounts of time the device is attached to the charger, battery status, and the like.

In some embodiments, the charge database 315 contains multiple entries, each entry indicating a charging status (e.g., attached to charger, detached from charger), the corresponding location, and a corresponding timestamp. Here, entries may be added to the charge database 315 each time the charging status changes. In some embodiments, the charge database 315 may include additional information, such as time spent at the location, charging rate information, charger type information, and the like.

The notification module 320, in one embodiment, is configured to automatically adjust the type and timing of notifications sent to the user based on the charge history. In various embodiments, the notification module 320 selects a notification based on the average charge duration at the device location and the charge recurrence associated with the device location. Moreover, the notification module 320 may select default notification if there is insufficient charge history for the device location. In various embodiments, the notification module 320 may include a selection module 325 configured to select the notification.

Additionally, the notification module 320 may present to the user at an appropriate time. Here, the appropriate time may be identified based on the charge history, a current charging status of the device, and/or the battery status (e.g., state-of-charge). As used herein, the current charging status of the device refers to whether the device is currently plugged in or not. In various embodiments, the notification module 320 may include a presentation module 330 configured to present the notification.

The selection module 325, in one embodiment, is configured to select a notification based on the charge history. In various embodiments, the selection module 325 selects one notification (or set of notifications) if the average charge duration indicates the devices plugged in to a charger for a long time at the device location, and selects a different notification (or set of notifications) if the average charge duration indicates the device is plugged into a charger for a short time at the device location. In further embodiments, the selection module 325 selects one notification (or set of notifications) if the charge recurrence indicates that the device is frequently plugged into a charger at the device location, and otherwise selects a different notification (or set of different occasions notifications) if the charge recurrence indicates that the device is in frequently plugged into a charger at the device location. Selection of different notifications based on average charge duration and/or charge recurrence is discussed in further detail below with reference to FIGS. 5-8.

In various embodiments, the selection module 325 selects a default notification if there is insufficient charge history corresponding to the device location. Here, an insufficient amount of charge history may be defined as the charge history having less than the threshold number of data points corresponding to the device location.

In some embodiments, the location-based power controller 300 may predict whether a charger is available at the device location based on the charge history. In various embodiments such prediction may be made by the location module 305, charge history module 310, and/or notification module 320. Moreover, the selection module 325 may select a notification that reminds the user to charge the apparatus in response to the charge history indicating that a charger is available at the device location and the charging status indicating that the device is not plugged-in. In such a scenario, the user may have forgotten to put the device into the charger. In some scenarios, the device may be plugged into the charger, but the charger may be unable to charge the device (e.g., due to the charger being unplugged from a wall outlet, charger being depleted, etc.). Here, the selected notification may alert the user that the charger is unable to charge device.

In various embodiments, the selection module 325 may select a notification informing the user an expected amount of charging. For example, the notification may inform the user of a current state-of-charge (e.g., 45% battery level) and an expected result (e.g., 85% battery level) if the device is charged at the device location over an expected stay at the device location (e.g., 30 minutes). Here, the selection module 325 may receive information from the location module 305 relating to an expected stay at the device location.

The presentation module 330, in one embodiment, is configured to present the selected notification, e.g., based on a charging status of the device. For example, the presentation module 330 may only present the selected notification if the device is not plugged in to the charger. In various embodiments, the presentation module 330 may present the selected notification further based on a battery status of the device, an elapsed time at the device location, and/or an estimated time remaining at the device location.

In some embodiments, the presentation module 330 waits the present amount of time after arriving at the device location before presenting the selected notification. Thus, if the user is passing through the device location or does not remain long at the device location, the user not be bothered with notifications regarding availability of charging at the device location. As an example, the device may wait 2-5 minutes after arriving at the device location before sending a reminder to plug in the device (assuming that the charge history indicates a charger is readily available at the device location). In various embodiments, the wait time may be selected based on the charge history. In one example, if the device location corresponds to a location having a long average duration of charging and a frequent charging recurrence, then a longer wait time may be selected based on an amount of time needed to charge the device fully.

Moreover, for locations where the user typically stays longer than is needed to charge the battery fully, the notification may be delayed (e.g., the wait time adjusted) based on a current estimate for time left at the device location. For example, the notification module 320 may dynamically set the notification time (e.g., dynamically adjust the wait time) so that the user is presented notification to plug in when a current estimate for time to fully charged battery (e.g., expected to charge time) is equal to a current estimate for the time left at the device location (e.g., based on an estimated time-of-departure).

The power mode module 335, in one embodiment, is configured to select a power management mode corresponding to the charge history at the device location. Examples of the power management mode include a best-performance mode, a battery-saving mode, and various blends of performance and battery savings. Note that battery savings is optimized at the expense of performance, while better performance uses more battery.

In some embodiments, the power mode module 335 may automatically adjust the power management mode based on the charge history at the device location. For example, in locations where the charge history indicates that a charger is available to device location, the power mode module 335 may be configured to automatically adjust the power management mode to improve the device performance (e.g., consuming higher amounts of energy), for example, by entering a best-performance mode. As another example, in locations where the charge history indicates a charger is often unavailable, the power mode module 335 may preemptively switch to a battery saving mode. Alternately, the power mode module 335 may be just a threshold state of charge of value for transitioning to the battery-saving mode (e.g., switch to the battery saving mode at a relatively higher state-of-charge).

The battery status module 340, in one embodiment, is configured to identify current status of the battery. In various embodiments, the current status of the battery includes a state-of-charge indication. The current status of the battery may also include an indication of whether the battery is being charged.

In some embodiments, the battery status module 340 may calculate an expected charge time based on the state-of-charge of the battery. Here, the expected charge time indicates an expected time required to charge the battery to a predetermined state-of-charge (e.g., 100%). In various embodiments, the battery status module 340 may predict a state-of-charge that can be achieved in a given amount of time. For example, the notification module 320 may inquire a state of charge that can be achieved in Z minutes, where the value of Z is based on an estimated time remaining at the present location. Thus, for the input value of 25 minutes, the battery status module 340 may predict the state-of-charge that can be achieved (e.g., from the current state-of-charge) in 25 minutes. Here, the prediction may be based on a historical rate of charge at the device location.

In various embodiments, the battery status module 340 notifies the notification module 320 of a current state-of-charge of the battery and indicates whether the battery is being charged. As discussed above, the notification module 320 may present the selected notification based on the current state-of-charge and based on whether the battery is being charged. In various embodiments, the battery status module 340 notifies the charge history module 310 whenever the battery is charged (or stops being charged). The charge history module 310 may update the charge history for the device location based on whether or not the battery is being charged.

Figure 4:
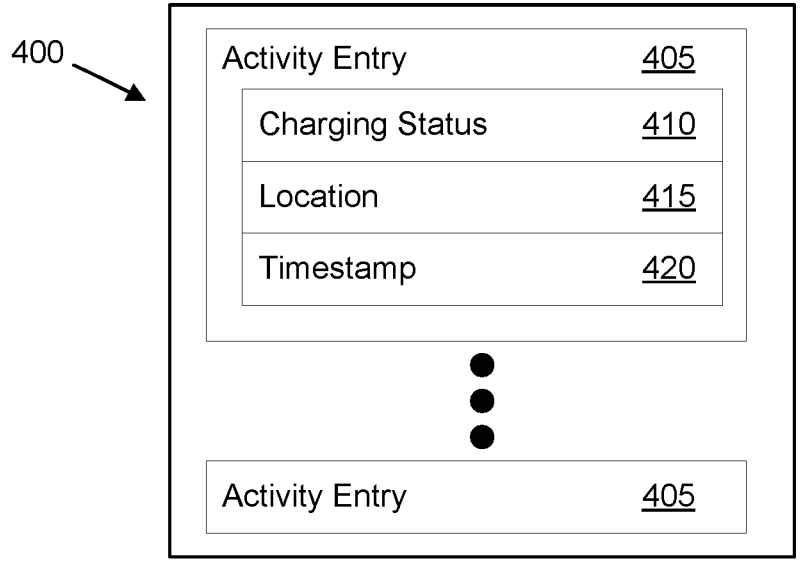
FIG. 4 is a block diagram in the street in one embodiment of a data structure used for selectively providing notifications based on charge history.

FIG. 4 depicts a data structure 400 for selectively providing notifications based on charge history, according to embodiments of the disclosure. In various embodiments, the data structure 400 may be created by an electronic device, such as the electronic device 105 and/or electronic device 200, by the location-based power management module 225, and/or by the location-based power controller 300. As depicted, the data structure 400 includes various activity entries 405, which (e.g., collectively) indicate the charge history. The data structure 400 may be one embodiment of the charge database 315.

The activity entries 405 contain various values related to the charge history. In the depicted embodiment, an activity entry 405 may include a charging status 410, a corresponding location field 415, and a corresponding timestamp field 420. In certain embodiments, an activity entry 405 may include additional information. For example, an activity entry 405 may include rate-of-charge information. As another example, an activity entry 405 may include information as to the type of charger (e.g., wireless charging, wired charging, charger identifier, wattage/output of the charger, etc.). The additional information may be in the form of a flag (e.g., 1-bit value), a bitmap, a string, etc.

In certain embodiments, the activity entries 405 contain battery status information separate from the charging status 410. For example, the charging status 410 may indicate whether the charger is attached or detached, while the battery status may indicate whether the battery is charging, discharging, or not charging (e.g., due to the electronic device relying on the charger for power instead of discharging the battery). Note that certain battery status states may be implied from the charging status 410. For example, if the charger is disconnected than the battery cannot charge and the device must rely on the battery for power. Thus, the battery status may be redundant whenever the charging status 410 indicates the electronic device is not connected to the charger. In such embodiments, battery status may be omitted (or ignored) whenever certain charging statuses (e.g., charger not connected) are indicated in the charging status 410.

In certain embodiments, the activity entries 405 contain power state information separate from the charging status 410 and/or battery status information. For example, the power state information may indicate whether the electronic device is awake (e.g., active), in a sleep mode, or powered off. Note that the logging capabilities of the electronic device may differ according to the power state. For example, satellite positioning information (e.g., location information 415) may be unavailable when the electronic device is asleep or powered off, however other information including charging status 410, battery status, time, etc. may still be logged when the electronic device is asleep. Accordingly, a power state indication such as "going to sleep" and "waking up" may indicate whether information in the location field 415 (or other information) is accurate. For example, location information logged between a "going to sleep" status and the next "waking up" status may be deemed unreliable.

In various embodiments, the charging status 410 indicates whether the electronic device is connected to a charger or disconnected from a charger. For example, the charging status 410 may be represented by 1-bit, with a first bit-value indicating that the charger was connected (e.g., the device was plugged-in) and the other bit-value indicating that the charger was disconnected (e.g., the device was unplugged). In another example, the charging status 410 may be a data string, for example representing "charger attached" or "charger detached", as appropriate.

Note that the charging status 410 may alternate from one activity entry 405 to the next, each activity entry 405 being generated in response to a change in the device charging status (e.g., device attached to charger, device detached from charger, battery charging, battery discharging, battery not charging while connected to charger, etc.). In certain embodiments, the charging status 410 additionally indicates whether the battery is being charged or not. Thus, the charging status 410 may be used to identify times when the devices plugged-in, but the battery is not being charged (e.g., due to being full).

In various embodiments, the location field 415 identifies a location where the charging takes place. The location may be a physical (e.g., geographical) location. As discussed above, the location may be determined using satellite coordinates, or other means. Further, locations with similar satellite coordinates may be distinguish one from another using additional information, such as available networks, network locations, nearby devices, nearby beacons, and the like. In some embodiments, the location field 415 may contain a pointer that references another data structure storing known charging locations. Moreover, in certain embodiments, the data structure 400 may store information relating to how long a user stays at the location associated with the activity entry 405 (without regard to whether the device was connected to the charger or not).

In some embodiments, the data structure 400 may store location arrival/departure information and related timing information. Here, the location information is tracked independently of charger status and battery status. For example, the data structure 400 may store an indicator of the status "arrived at location" and a corresponding timestamp. In another example, the data structure 400 may store an indicator of the status "left location" and a corresponding timestamp. In such embodiments, the electronic device may generate a new activity entry 405 each time the electronic device arrives at or departs from a location. In certain embodiments, the data structure 400 only tracks arrival at and departure from specific locations, such as locations where the electronic device has been attached to a charger. For example, a list of charging locations may be maintained (either in the data structure 400 or another data structure) and a new activity entry 405 generated if the electronic device arrives at a location in the list or departs from a location in the list.

In various embodiments, a value in the timestamp field 420 may correspond to a time when the charging status 410 changes. Additionally, a value in the timestamp field 420 may correspond to a time when a battery status changes or to an arrival/departure status. Thus, the collection of timestamps 420 may be used to identify how long the device is charged (e.g., the charging duration). In certain embodiments, the timestamp field 420 may include multiple timestamps. Examples of timestamps include, but are not limited to, a timestamp for when the device is plugged in, a timestamp for when the battery is charged, a timestamp for when the battery stops charging (e.g., due to being full), a timestamp for when the device is unplugged, a timestamp for when the device leaves the location, etc. Accordingly, multiple timestamps allow the activity entry 405 to store additional information relating to the device's charge history. Note that where multiple timestamps are included, the charging status 410 may be implied in the multiple timestamps. In such embodiments, the charging status 410 may be omitted where the multiple timestamps implicitly include charging status information.

Figure 5:
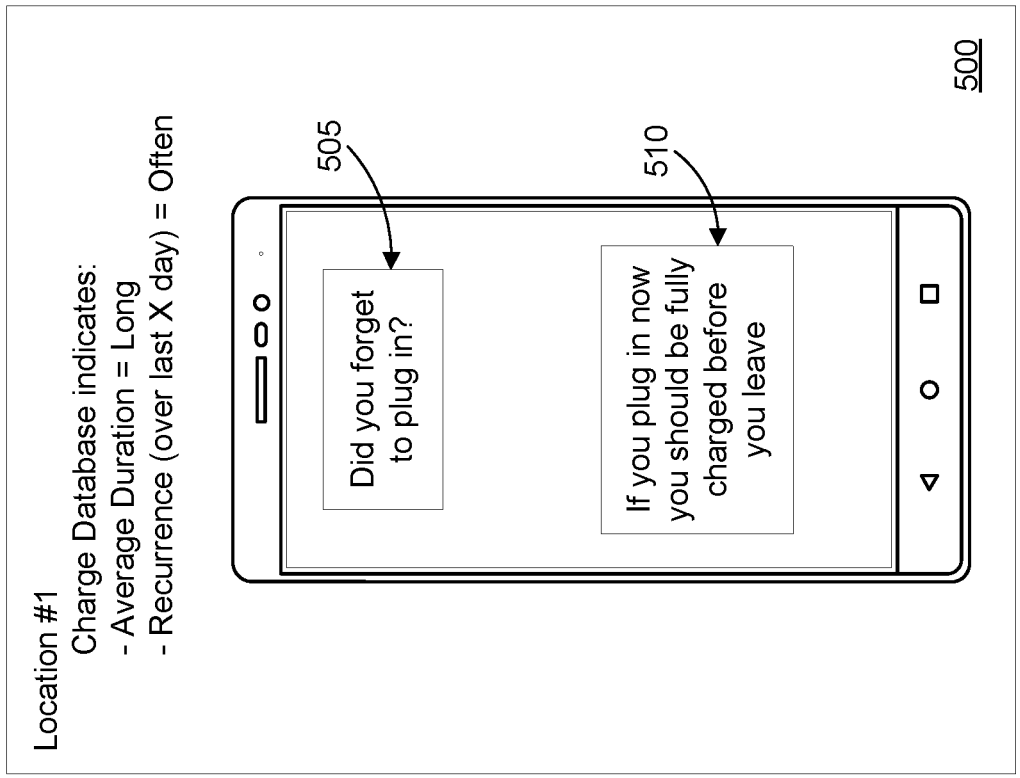
FIG. 5 is a diagram illustrating a first scenario of providing a notification based on location and charge history.

FIG. 5 depicts a first scenario for selectively providing notifications based on charge history, according to embodiments of the disclosure. In the first scenario, the electronic device 200 is in a first location 500. Here, the electronic device 200 determines (from the charge database) that the average charge duration is categorized as 'long' and the frequency of charging at this location (e.g., over the last X days) is categorized as 'often.' Moreover, the electronic device 200 assumes that a charger is present at the location 500 (e.g., based on the charge history).

In one embodiment, if the electronic device 200 is not being charged at the location 500 (e.g., the user just forgot, or the charger/power adapter is not plugged in at wall), then the electronic device 200 may provide the notification 505 ("Did you forget to plug in?"). Note that the electronic device 200 may wait a certain amount of time before presenting the notification 505.

In another embodiment, if at this location the electronic device 200 is not being charged, then the electronic device 200 may estimate an amount of time required to fully charge the battery and a time the user will remain at the location 500. The electronic device 200 may then present the notification 510 ("If you plug in now you should be fully charged before you leave") at a time when the current estimate for time to fully charge the battery is equal to current estimate for time left at the location 500.

As discussed above, the electronic device 200 may automatically switch to a high-performance power management mode based on the assumed availability of the charger at the location 500, even if the electronic device 200 is currently unplugged from the charger. Note that the power mode may affect the estimated time to fully charge the battery.

Figure 6:
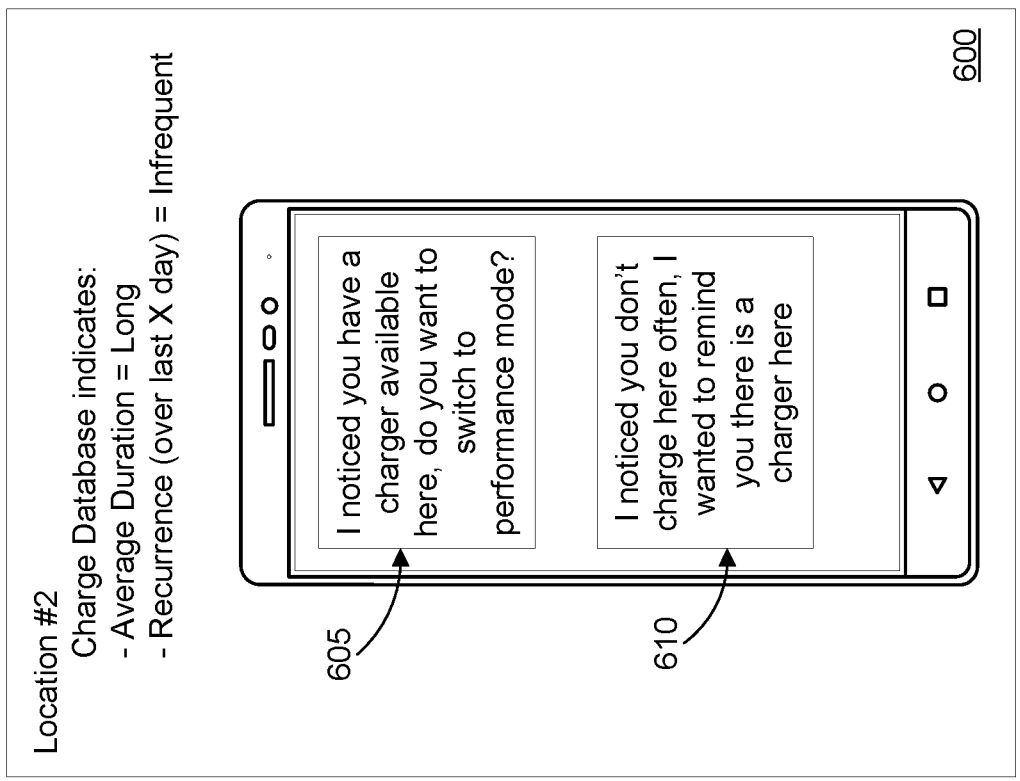
FIG. 6 is a diagram illustrating a second scenario of providing a notification based on location and charge history.

FIG. 6 depicts a second scenario for selectively providing notifications based on charge history, according to embodiments of the disclosure. In the second scenario, the electronic device is at a second location 600. Here, the electronic device 200 determines (from the charge database) that the average duration of charging at the location 600 is categorized as 'long' and the frequency of charging at this location (e.g., over the last X days) is categorized as 'infrequently.' Moreover, the electronic device 200 assumes that a charger is present at the location 600 (e.g., based on the charge history).

In one embodiment, the electronic device 200 presents a notification 605 prompting the user to switch to the high-performance mode due to the assumed availability of a charger.

In another embodiment, if the electronic device 200 is not being charged at the location 600, then the electronic device 200 may provide a notification 610 reminding the user to charge at the location. An example notification includes: "I've noticed you don't frequently charge here, just wanted to remind you." In certain embodiments, rather than presenting the reminder notification right away, the electronic device waits to present the message until a threshold amount of time has passed (e.g., 20 minutes), or the battery state-of-charge passes below a threshold charge level (e.g., 60%).

Figure 7:
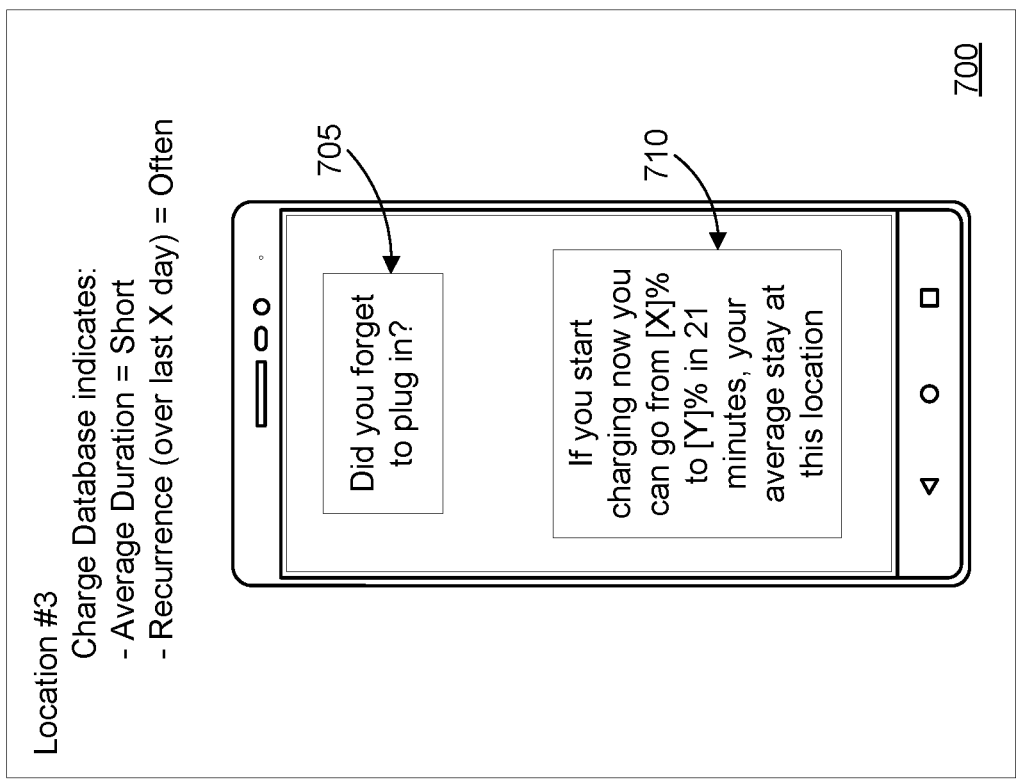
FIG. 7 is a diagram illustrating a third scenario of providing a notification based on location and charge history.

FIG. 7 depicts a third scenario for selectively providing notifications based on charge history, according to embodiments of the disclosure. In the third scenario, the electronic device is at a third location 700. Here, the electronic device 200 determines (from the charge database) that the average duration of charging at a location is categorized as 'short' and the frequency of charging at this location 700 (e.g., over the last X days) is categorized as 'often.' In certain embodiments, the electronic device 200 assumes that a charger is present at the location (e.g., based on the charge history).

In one embodiment, if the electronic device 200 is not being charged at the location 700, then the electronic device 200 presents a notification 705 reminding the user to plug in while at the location 700. In another embodiment, if at this location the electronic device 200 is not being charged, then the electronic device 200 may provide a more detailed notification 710 to charge up while at the location. Here, the notification 710 indicates the average stay at the location (depicted here as 21 minutes) and an estimated increase in state-of-charge achievable during this time.

Figure 8:
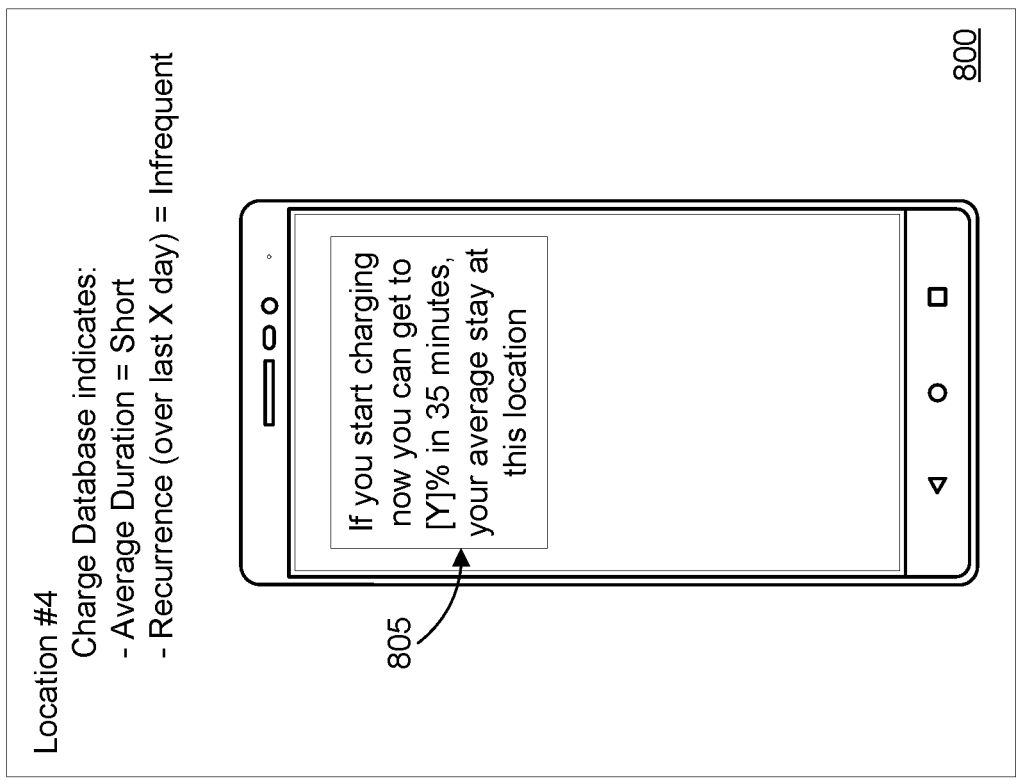
FIG. 8 is a diagram illustrating a fourth scenario of providing a notification based on location and charge history.

FIG. 8 depicts a fourth scenario for selectively providing notifications based on charge history, according to embodiments of the disclosure. In the fourth scenario, the electronic device is at a fourth location 800. Here, the electronic device 200 determines (from the charge database) that the average duration of charging at a location is categorized as 'short' and the frequency of charging at this location (e.g., over the last X days) is categorized as 'infrequent.' In certain embodiments, the electronic device 200 does not assume that a charger is present at the location 800 (e.g., based on the charge history).

Because of the unknown availability of a charger at this location, the electronic device 200 may preemptively switch to a battery saving mode or may adjust a threshold for automatically triggering the battery saving mode to do so at a relatively higher battery charge level. Additionally, the electronic device 200 may provide the notification 805 to charge up when the battery level passes below a threshold.

Figure 9:
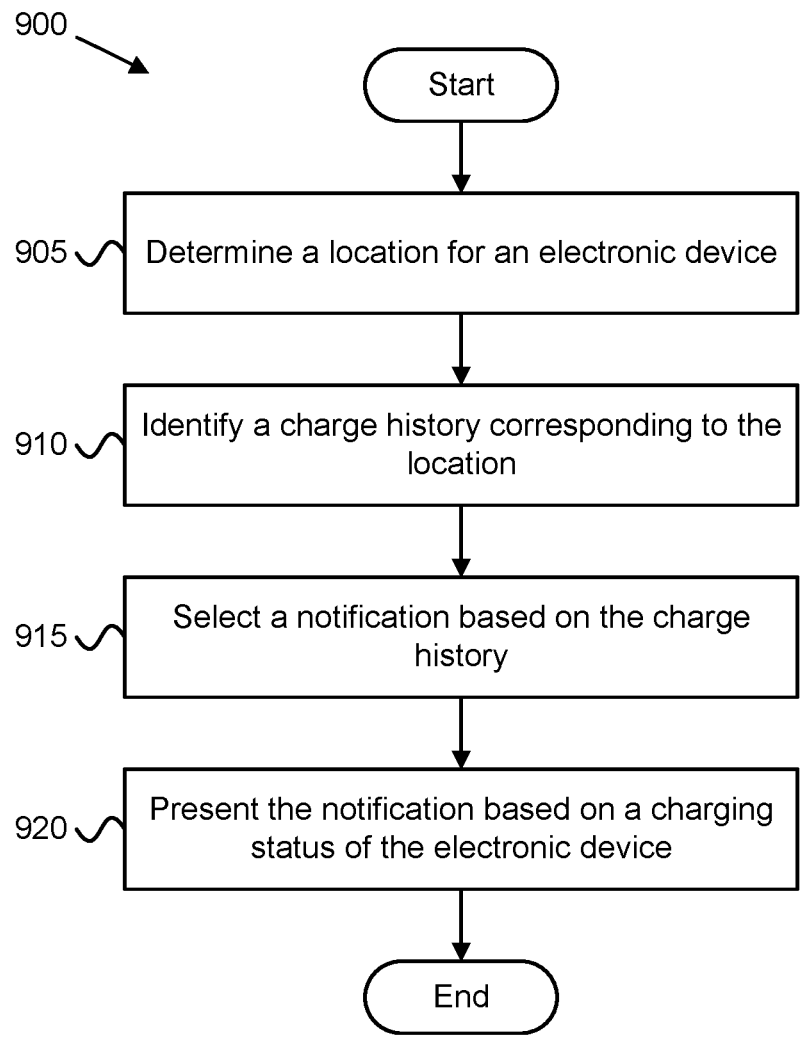
FIG. 9 is a flowchart diagram illustrating one embodiment of a method for selectively providing notifications based on charge history.

FIG. 9 depicts a method 900 for selectively providing notifications based on charge history, according to embodiments of the disclosure. In some embodiments, the method 900 is performed by the electronic device 105, the electronic device 200, the location-based power management module 225, and/or the location-based power controller 300, described above. In some embodiments, the method 900 is performed by a processor, such as a microcontroller, a microprocessor, a central processing unit (CPU), a graphics processing unit (GPU), an auxiliary processing unit, a FPGA, or the like.

The method 900 begins and determines 905 a location for an electronic device. The method 900 includes identifying 910 a charge history corresponding to the location. The method 900 includes selecting 915 a notification based on the charge history. The method 900 includes presenting 920 the notification based on a charging status of the electronic device. The method 900 ends.

Figure 10:
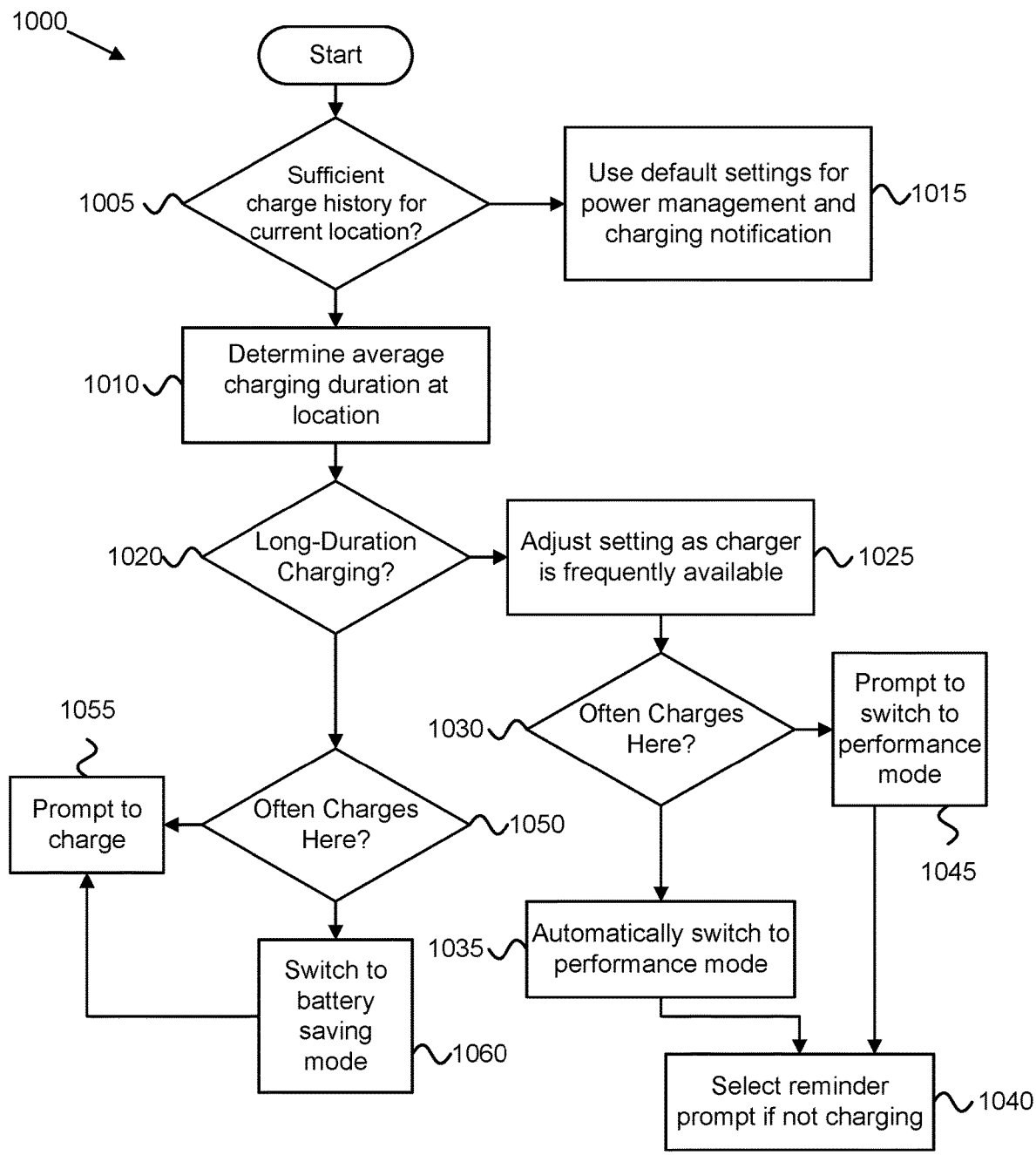
FIG. 10 is a flowchart diagram illustrating another embodiment of a method for selectively providing notifications based on charge history.

FIG. 10 depicts a method 1000 for selectively providing notifications based on charge history, according to embodiments of the disclosure. In some embodiments, the method 1000 is performed by the electronic device 105, the electronic device 200, the location-based power management module 225, and/or the location-based power controller 300, described above. In some embodiments, the method 1000 is performed by a processor, such as a microcontroller, a microprocessor, a central processing unit (CPU), a graphics processing unit (GPU), an auxiliary processing unit, a FPGA, or the like.

The method 1000 begins and determines 1005 whether there is sufficient charge history for a current location. If there is sufficient history, then the method 1000 proceeds to identify 1010 an average charging duration for the current location. Otherwise, if there is not sufficient history then the method 1000 applies 1015 default settings for power management and charging notification.

After identifying 1010 the average charging duration, the method 1000 determines 1020 whether the average charging duration is categorized as 'long-duration' charging. If the average charging duration is 'long-duration,' then the method 1000 adjusts 1025 one or more power management notification settings based on the assumption that a charger is frequently available. For example, adjusted settings may include the notification types, state-of-charge thresholds for showing the notifications, and the like.

Additionally, the method 1000 determines 1030 whether the device is charged often at the current location (referring to charge recurrence). If the device is charged often at the current location, then the method 1000 switches 1035 automatically to performance mode and selects 1040 a reminder prompt if the device is not currently charging (or not currently plugged in to a charger). Otherwise, if the device is not charged often at the current location, the method 1000 may prompt 1045 the user to switch to performance mode. Additionally, the method 1000 selects 1040 a reminder prompt if the device is not currently charging (or not currently plugged in to a charger).

However, if the average charging duration is not 'long-duration,' then the method 1000 determines 1050 whether the device is charged often at the current location (referring to charge recurrence). If the device is charged often at the current location, then the method 1000 prompts 1055 the user to charge the device (e.g., plug in to charger). Otherwise, if the device is not charged often at the current location, the method 1000 switches 1060 to a battery saving mode. Additionally, the method 1000 prompts 1055 the user to charge the device (e.g., plug in to charger). Here, the prompt may be presented after the battery state-of-charge drops below a threshold amount. The method 1000 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor; and
   a memory that stores code executable by the processor to:
      determine a device location for the apparatus;
      identify a charge history corresponding to the device location; and
      automatically implement a best-performance power management mode based on the charge history corresponding to the determined device location for the apparatus.

2. The apparatus of claim 1, wherein the processor maintains a charge database based on the charge history, the charge database storing: a charger state, a charge location associated with the charger state, and a timestamp of the charger state.

3. The apparatus of claim 1, wherein:
   the processor further:
      selects a notification based on the charge history, and
      presents the notification based on a charging status of the apparatus; and
   selecting the notification comprises selecting a default notification in response to the charge history having less than a threshold number of datapoints.

4. The apparatus of claim 1, wherein:
   the processor further:
      selects a notification based on the charge history, and
      presents the notification based on a charging status of the apparatus; and
   selecting the notification comprises selecting a reminder to charge the apparatus in response to the charge history indicating a charger is available at the device location.

5. The apparatus of claim 4, wherein presenting the notification based on the charging status of the apparatus comprises presenting the notification a preset amount of time after arriving at the device location.

6. The apparatus of claim 1, wherein the processor further:
   selects a notification based on the charge history;
   presents the notification based on a charging status of the apparatus;
   calculates an expected charge time based on a state-of-charge of the apparatus; and
   estimates a time-of-departure based on a location history corresponding to the device location,
   wherein presenting the notification based on the charging status of the apparatus comprises presenting the notification based on the expected charge time and the time-of-departure.

7. The apparatus of claim 1, wherein the best-performance power management mode is implemented in response to the charge history indicating that the apparatus is often charged at the device location or is charged for a long duration.

8. The apparatus of claim 1, wherein implementing the best-power management mode comprises adjusting a threshold value for transitioning to a battery-saving power management mode.

9. A method comprising:
   determining a location for an electronic device;
   identifying a charge history corresponding to the location; and
   automatically implement a best-performance power management mode based on the charge history corresponding to the determined device location for the apparatus.

10. The method of claim 9, further comprising maintaining a charge database based on the charge history, the charge database storing: a charger state, a charge location associated with the charger state, and a timestamp of the charger state.

11. The method of claim 9, further comprising:
    selecting a notification based on the charge history; and
    presenting the notification based on a charging status of the apparatus,
    wherein selecting the notification comprises selecting a default notification in response to the charge history having less than a threshold number of datapoints.

12. The method of claim 9, further comprising:
    selecting a notification based on the charge history; and
    presenting the notification based on a charging status of the apparatus,
    wherein selecting the notification comprises selecting a reminder to charge the electronic device in response to the charge history indicating a charger is available at the location.

13. The method of claim 12, wherein presenting the notification based on the charging status of the electronic device comprises presenting the notification a preset amount of time after arriving at the location.

14. The method of claim 9, further comprising:
    selecting a notification based on the charge history;
    presenting the notification based on a charging status of the apparatus;
    calculating an expected charge time based on a state-of-charge of the electronic device; and
    estimating a time-of-departure based on a location history corresponding to the location,
    wherein presenting the notification based on the charging status of the electronic device comprises presenting the notification based on the expected charge time and the time-of-departure.

15. The method of claim 9, wherein the best-performance power management mode is implemented in response to the charge history indicating that the electronic device is often charged at the location or is charged for a long duration.

16. A program product comprising a computer-readable storage medium that stores code executable by a processor, the executable code comprising code to:
    detect a location of an electronic device;
    identify a charge history corresponding to the location; and
    automatically implementing a best-performance power management mode based on the charge history corresponding to the determined device location for the apparatus.

17. The program product of claim 16, further comprising code to: maintain a charge database based on the charge history, the charge database storing: a charger state, a location associated with the charger state, and a timestamp of the charger state.

18. The program product of claim 16, wherein the best-performance power management mode is implemented in response to the charge history indicating that the electronic device is often charged at the location or is charged for a long duration.

19. The program product of claim 16, further comprising code to:
    select a notification based on the charge history;

present the notification based on a charging status of the apparatus;
calculate an expected charge time based on a state-of-charge of the apparatus; and
estimate a time-of-departure based on a location history corresponding to the device location,
wherein presenting the notification based on the charging status of the apparatus comprises presenting the notification based on the expected charge time and the time-of-departure.

20. The program product of claim 16, wherein implementing the power management mode comprises adjusting a threshold value for transitioning to a battery-saving power management mode.

\* \* \* \* \*